B. B. GORDON.
LOCOMOTIVE SCALE.
APPLICATION FILED FEB. 21, 1916.

1,218,253.

Patented Mar. 6, 1917.
13 SHEETS—SHEET 1.

WITNESSES:
Charles L. Fischer.
Nest C. Thompson.

INVENTOR.
BYRON B. GORDON
BY E. H. Bond
ATTORNEY.

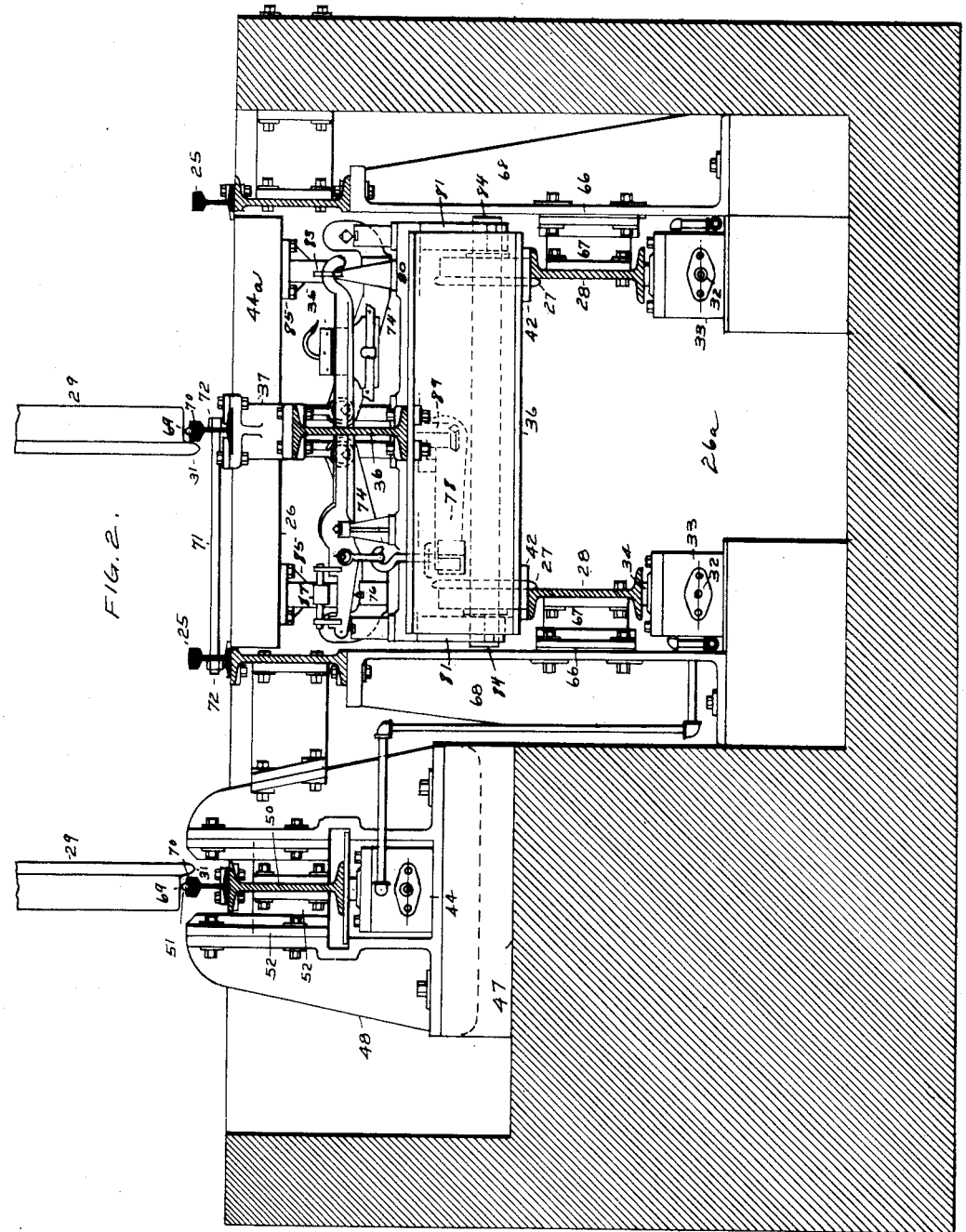

B. B. GORDON.
LOCOMOTIVE SCALE.
APPLICATION FILED FEB. 21, 1916.
1,218,253.
Patented Mar. 6, 1917.
13 SHEETS—SHEET 3.
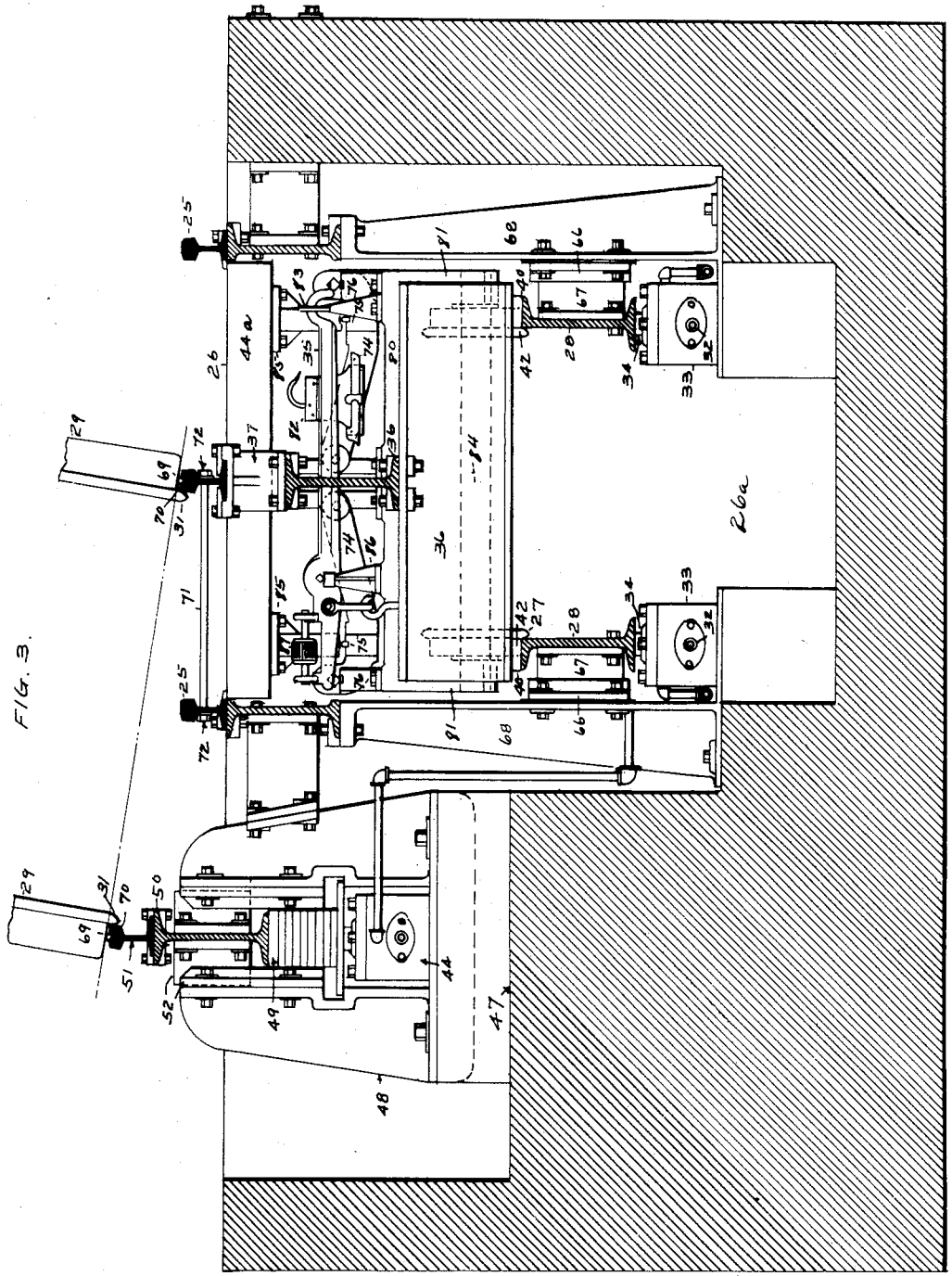
WITNESSES:
Charles L. Fischer
West E. Thompson
INVENTOR.
BYRON B. GORDON.
BY E. H. Bond
ATTORNEY.

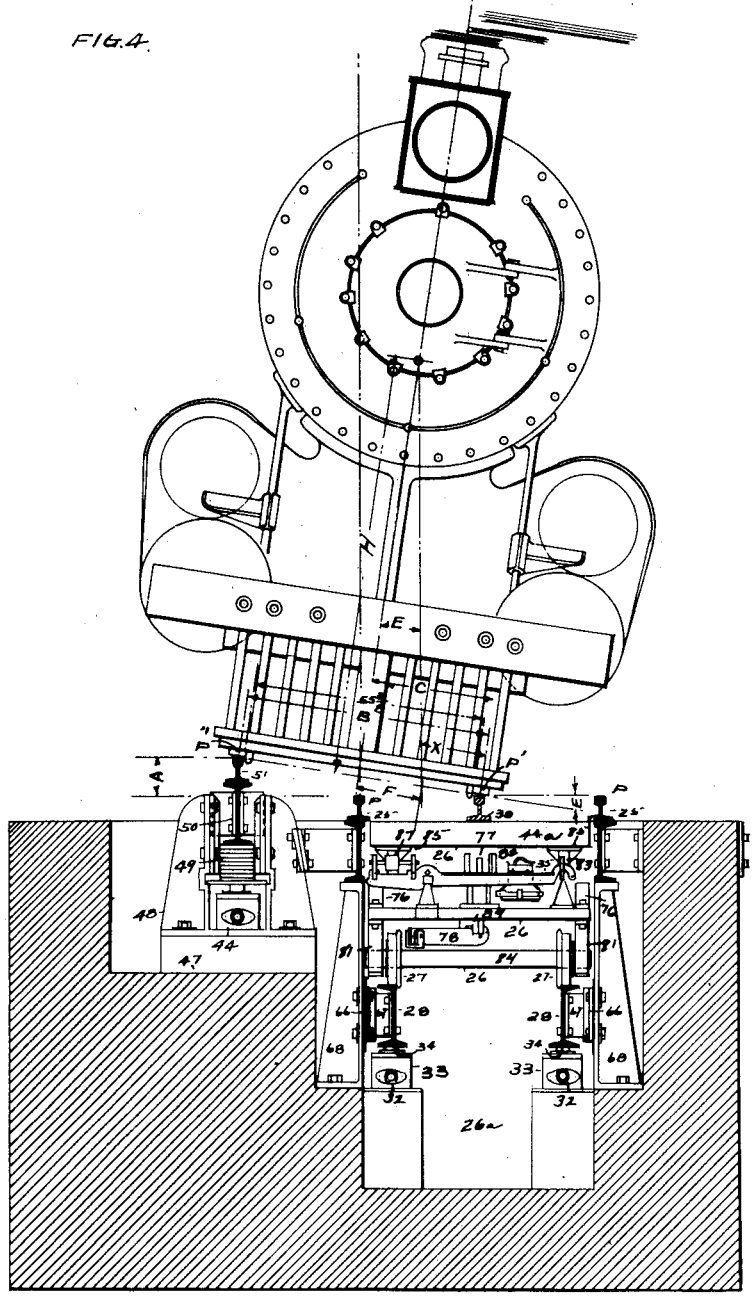

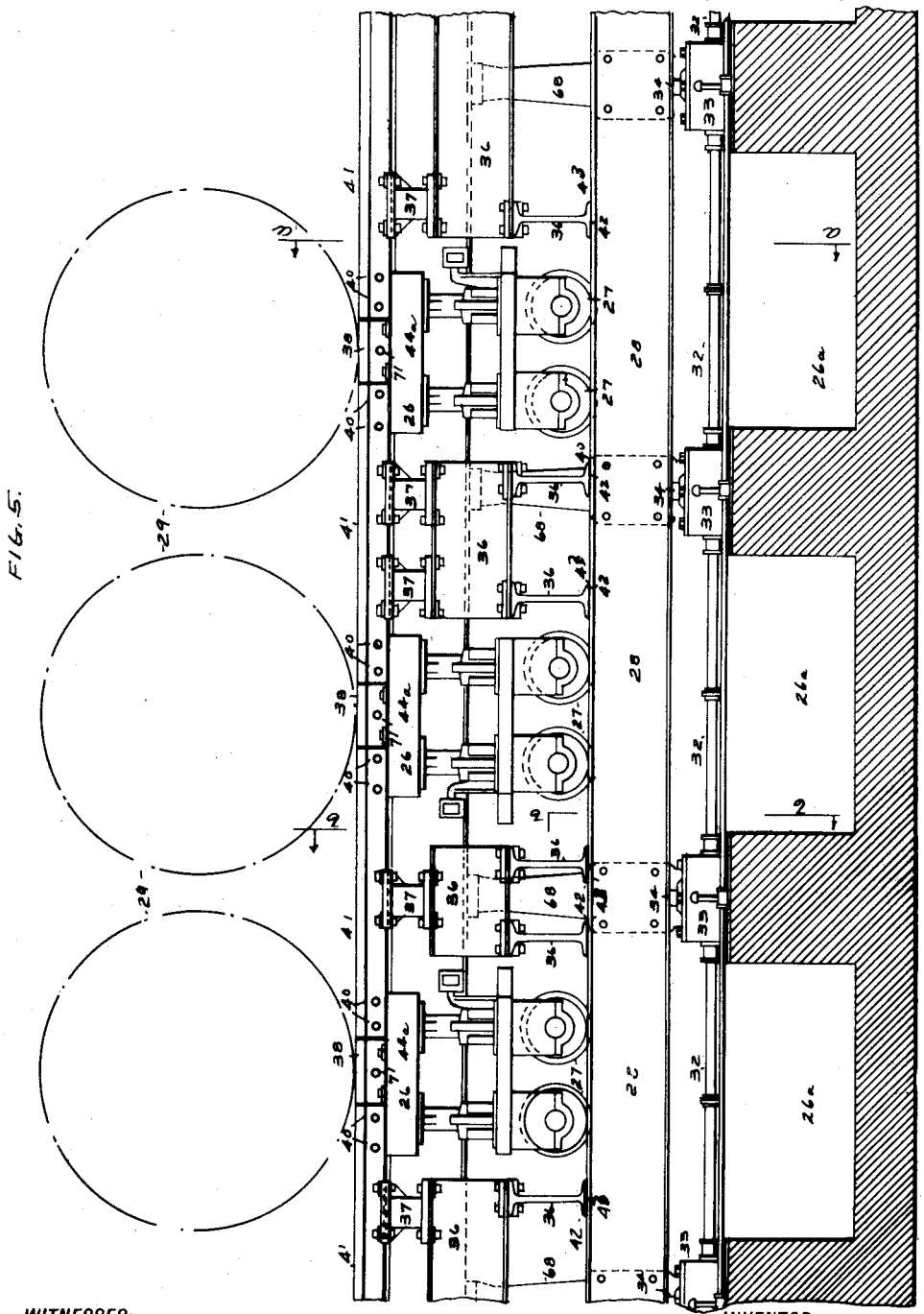

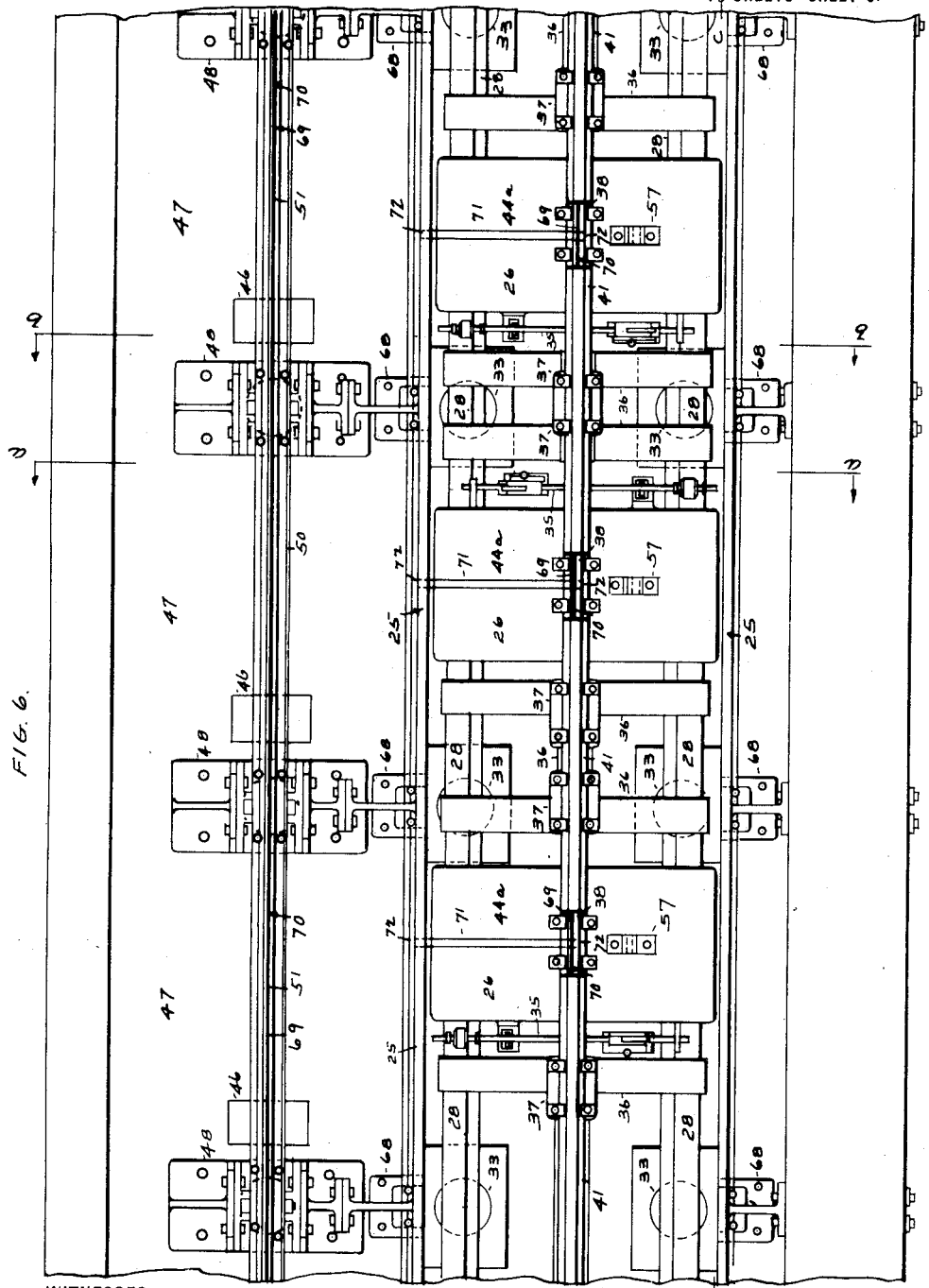

B. B. GORDON.
LOCOMOTIVE SCALE.
APPLICATION FILED FEB. 21, 1916.
1,218,253.
Patented Mar. 6, 1917.
13 SHEETS—SHEET 7.
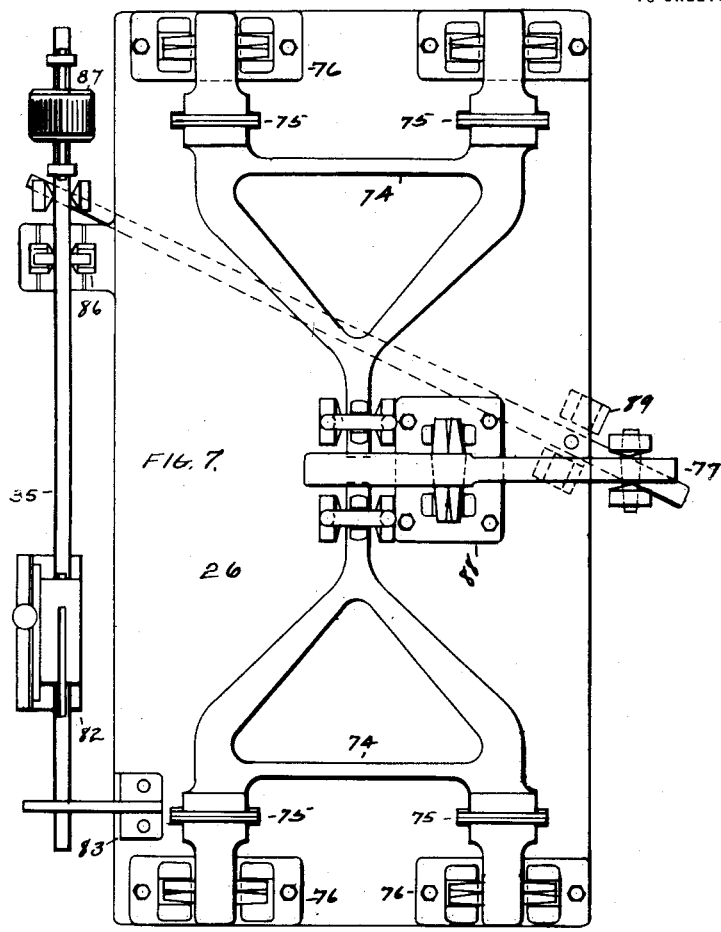
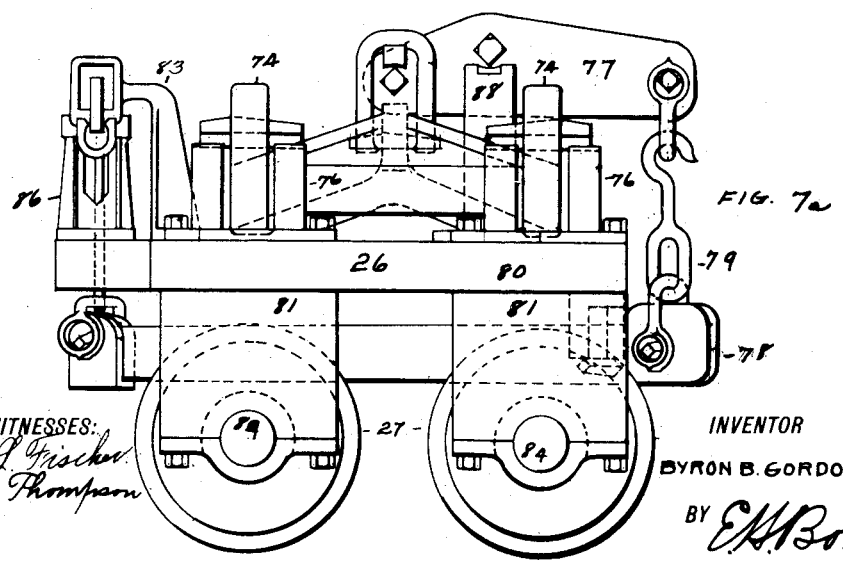
WITNESSES:
Charles L Fischer
Neat E Thompson
INVENTOR
BYRON B. GORDON
BY E H Bond
ATTORNEY

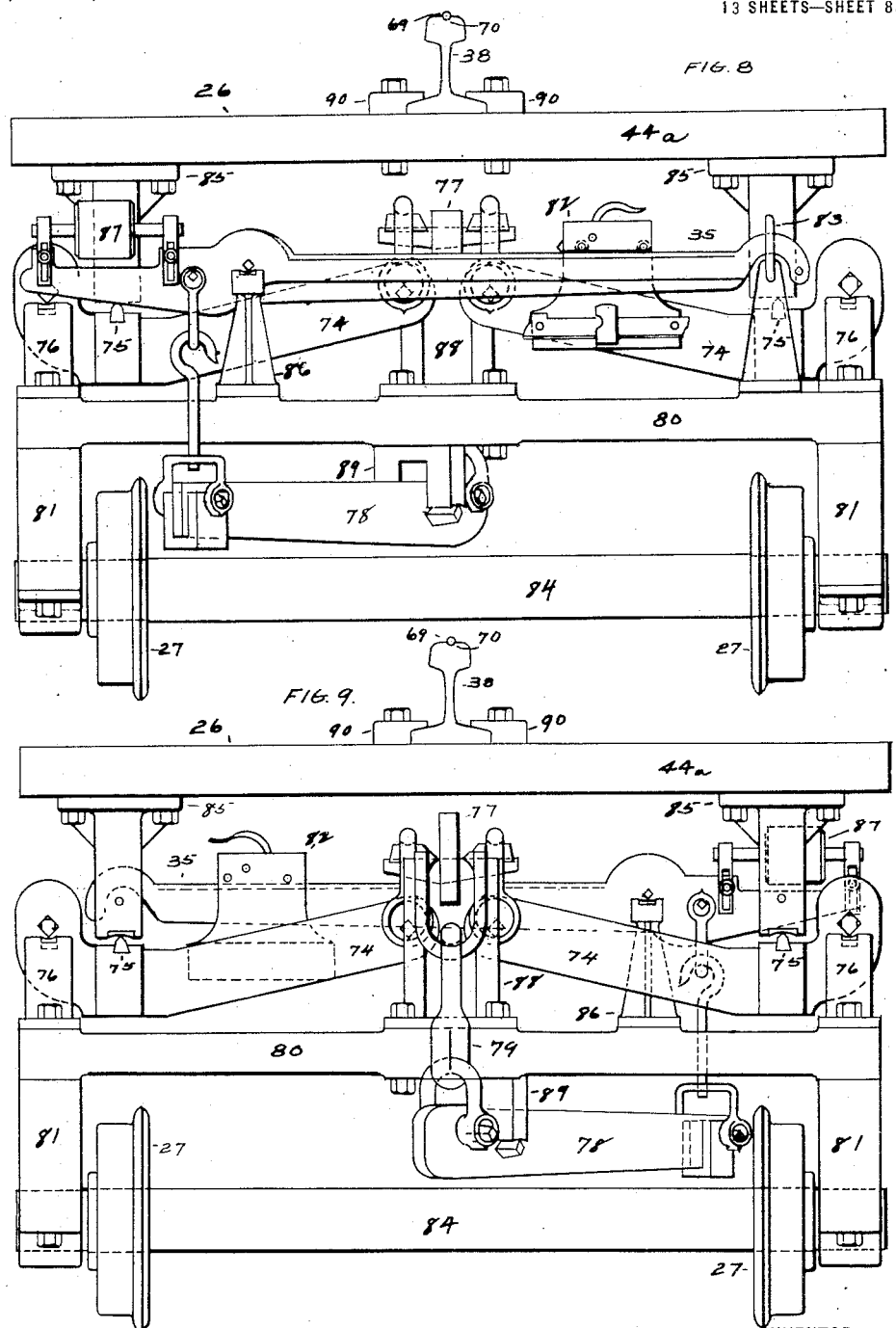

B. B. GORDON.
LOCOMOTIVE SCALE.
APPLICATION FILED FEB. 21, 1916.
1,218,253.
Patented Mar. 6, 1917.
13 SHEETS—SHEET 9.
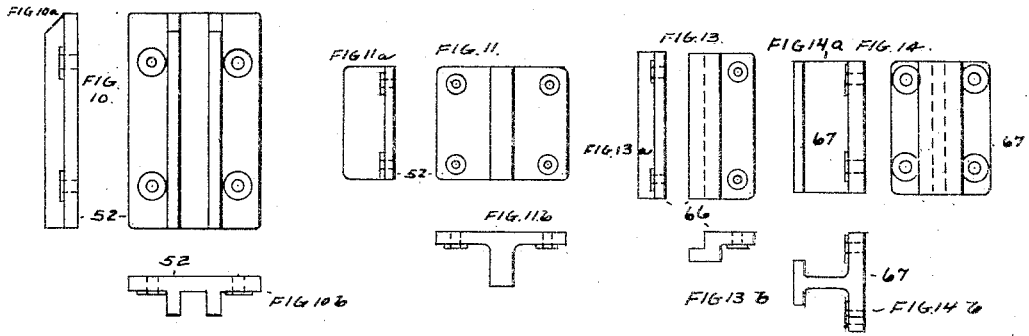
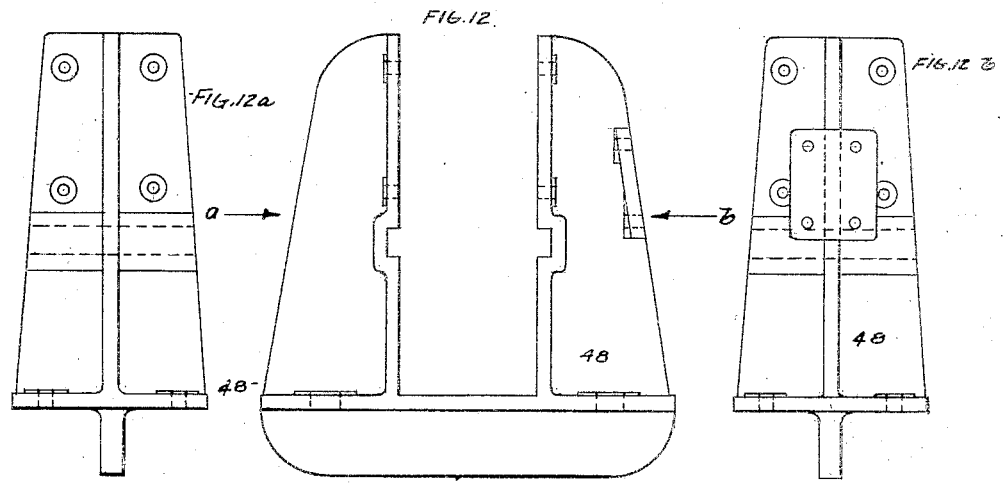
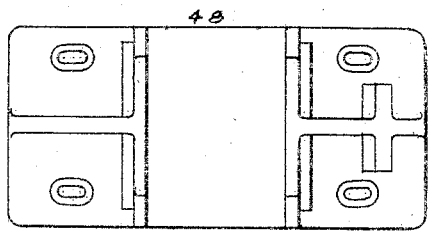
WITNESSES:
Charles L. Fischer.
Nest C. Thompson.
INVENTOR
BYRON B. GORDON.
BY E. H. Bond
ATTORNEY

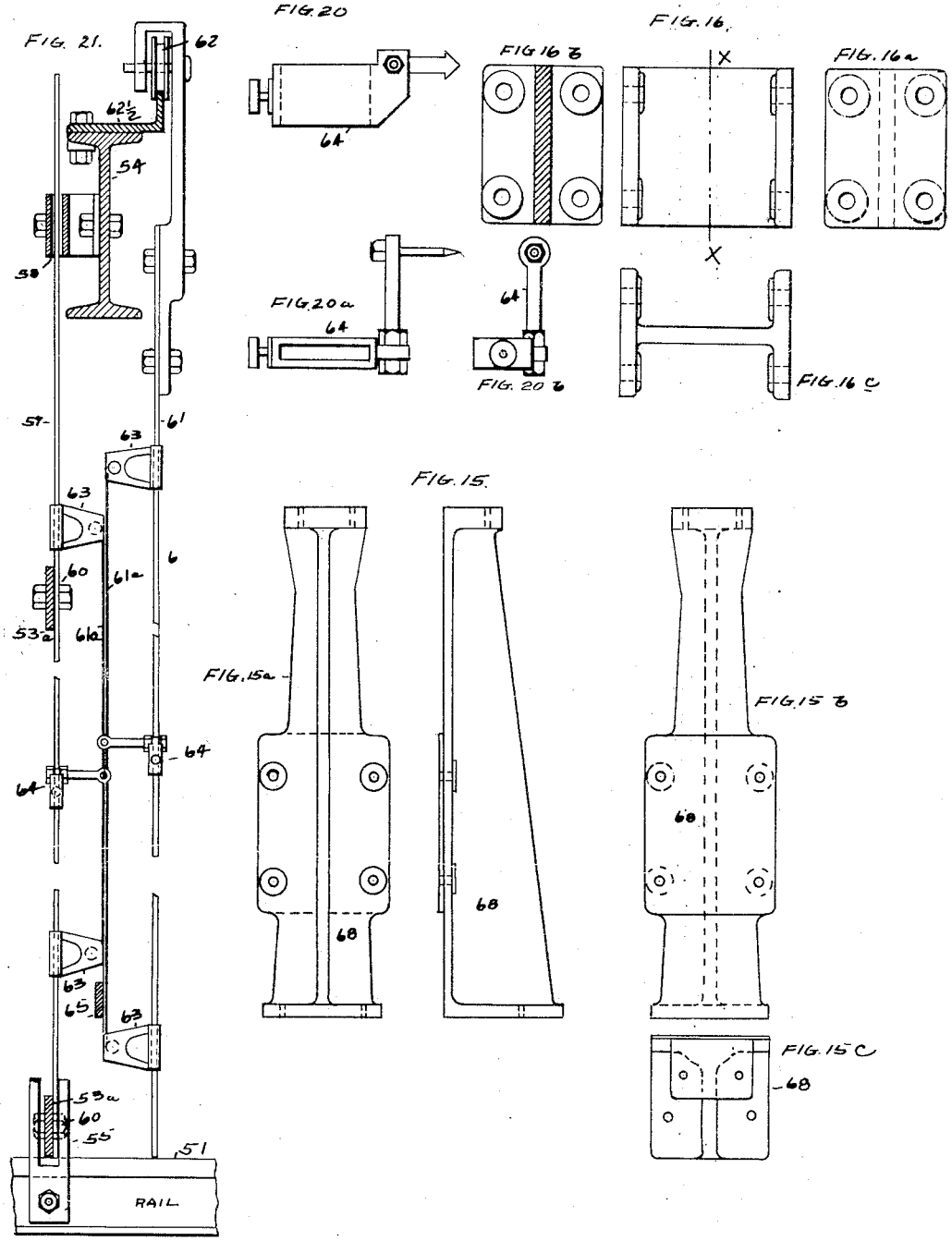

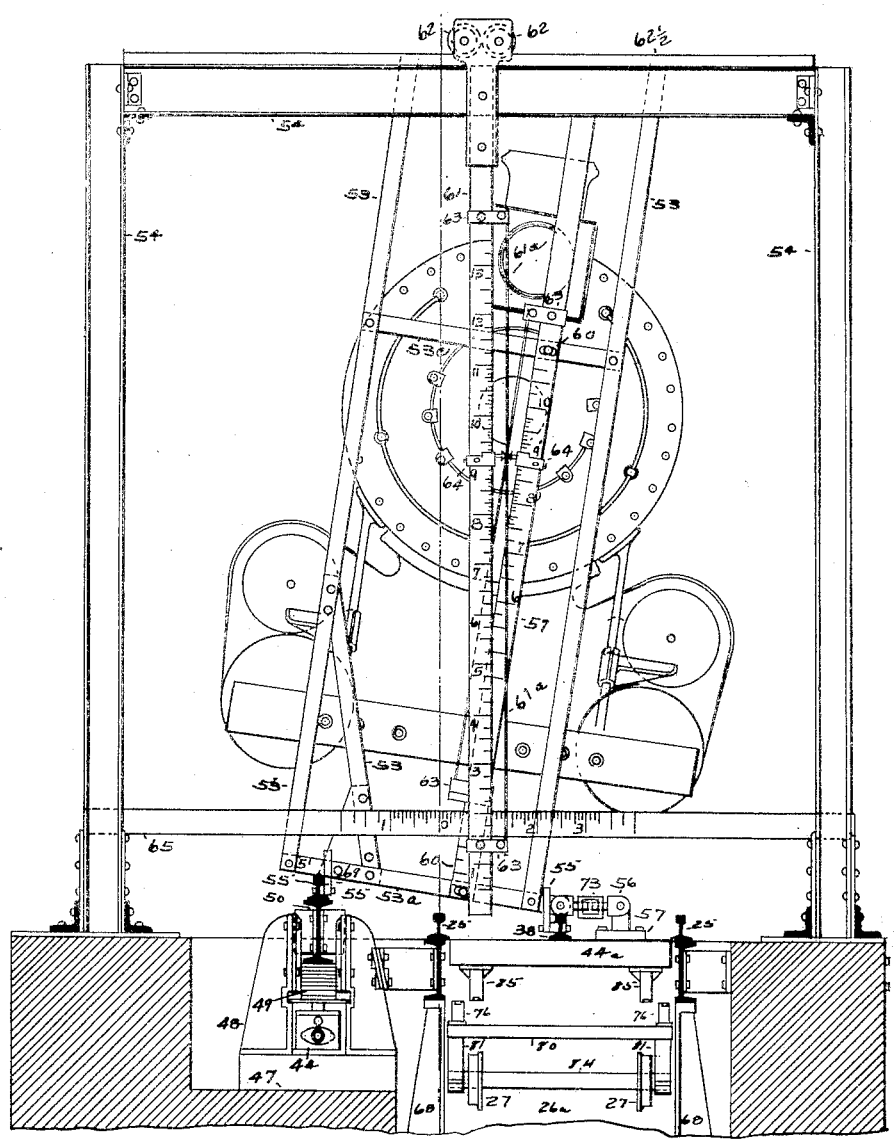

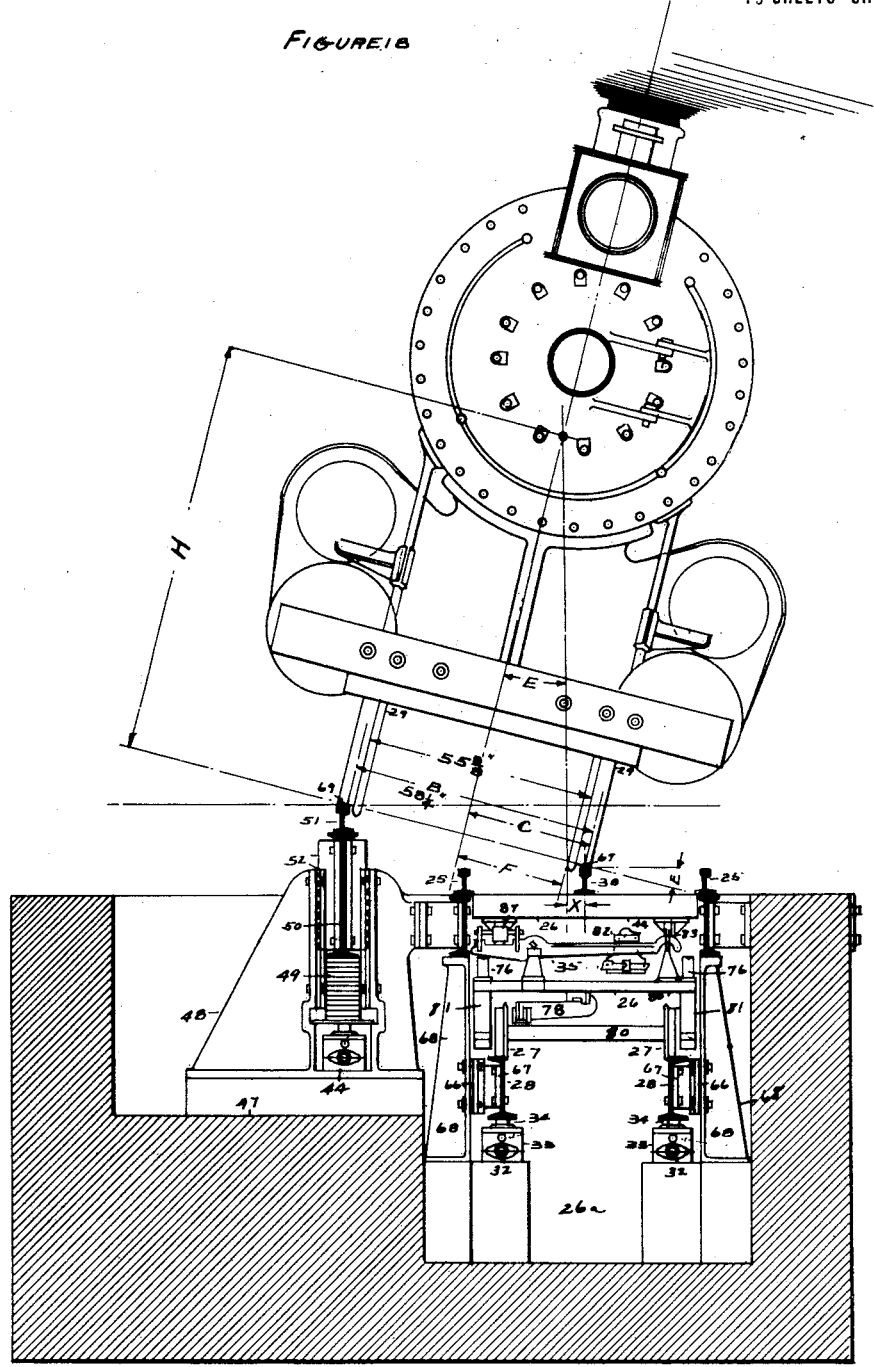

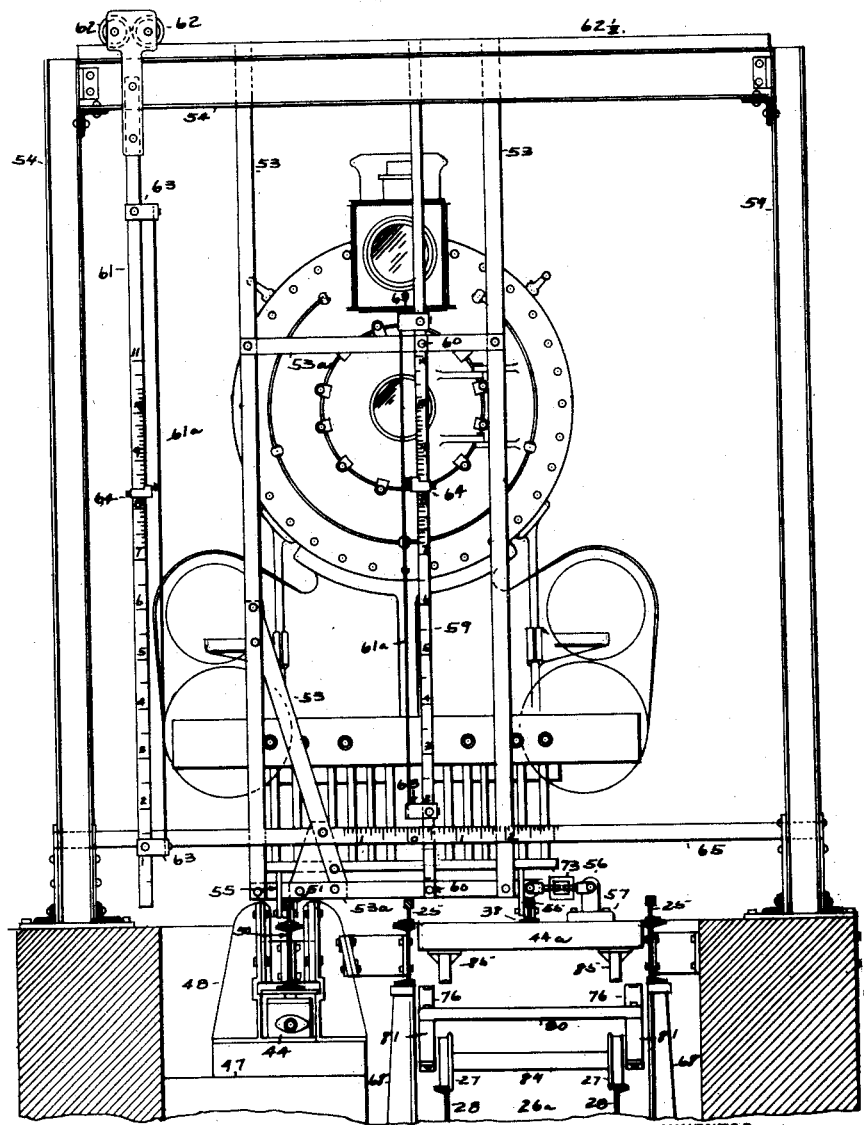

UNITED STATES PATENT OFFICE.

BYRON B. GORDON, OF LOGANSPORT, INDIANA.

LOCOMOTIVE-SCALE.

1,218,253. Specification of Letters Patent. Patented Mar. 6, 1917.

Application filed February 21, 1916. Serial No. 79,607.

*To all whom it may concern:*

Be it known that I, BYRON B. GORDON, a citizen of the United States, residing at Logansport, in the county of Cass and State of Indiana, have invented certain new and useful Improvements in Locomotive-Scales, of which the following is a specification.

This invention relates to certain new and useful improvements in locomotive scales. It has for its objects among others to provide means for ascertaining the weight on each axle of a locomotive as well as the weight on each end of same.

Another object of the invention is to provide means by which the locomotive or other object can be tilted and weighed in that position as an aid in locating the center of gravity.

Another object of the scale is to provide guides for the scale track in order to facilitate its rise and fall in connection with hydraulic jacks.

Another object of the invention is to provide a reinforced dead track in order to reduce the deflection of the rail to a minimum and also provide ample day-light for the pit.

Another object of the invention is to provide an indicator rigging as an aid in locating the center of gravity.

Similar letters refer to similar parts throughout the several views.

Referring to the drawings,

Fig. 2 is a cross section taken on line $b$—$b$ of Figs. 5 and 6 showing the structural iron and rail in place for ascertaining the weight on each end of the axle as well as providing means for weighing the engine when tilted.

Fig. 3 is a cross section taken on line $b$—$b$ of Figs. 5 and 6 showing the rolling stock or locomotive elevated or tilted for the purpose of ascertaining the weight on the lower rail, it being the only rail on the scale.

Fig. 4 is a view partly in vertical cross section and partly in end elevation showing the maximum height of the outside rail in rounding a curve.

Fig. 5 is a longitudinal sectional view on the line $c$—$c$ of Fig. 6 for the purpose of showing the relative location of the dead track between the scale units and the manner of building it up.

Fig. 6 is a portional plan view of the scale showing the relative location of the dead track between the scale units and the structural iron supporting the same.

Fig. 7 is a plan of a scale unit with the deck removed.

Figure 1:
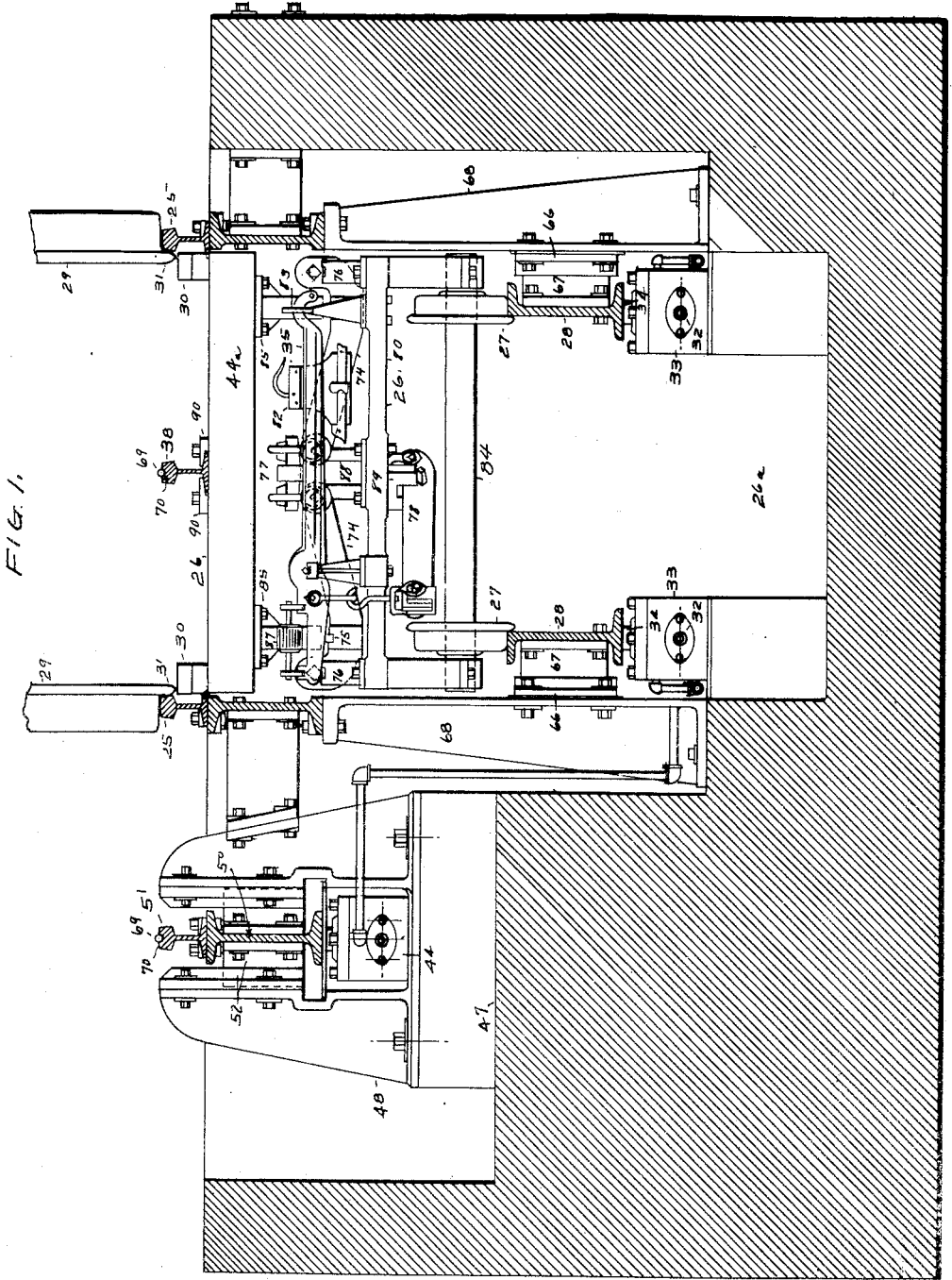
Figure 1 is a cross section of the scale taken on line $a$—$a$ of Figs. 5 and 6 (with center rail removed) showing the scale in normal condition for axle loads.

Fig. 7$^a$ is an end elevation of the same.

Fig. 8 is a front view of the scale unit, while

Fig. 9 is a rear view.

Fig. 10 is a top plan of the guide for the tilting I-beam.

Fig. 10$^a$ is an edge view of the same.

Fig. 10$^b$ is an end elevation thereof.

Fig. 11 is a plan view of the member co-operating with the guide.

Fig. 11$^a$ is an edge view thereof.

Fig. 11$^b$ is an end elevation of the same.

Fig. 12 is a side elevation of the bracket or brace for the tilting I-beam.

Fig. 12$^a$ is an edge view looking in the direction of the arrow $a$ in Fig. 12.

Fig. 12$^b$ is an edge view looking in the direction of the arrow $b$ in Fig. 12.

Fig. 12$^c$ is a plan view of the same.

Fig. 13 is a plan view of the guide for the scale track.

Fig. 13$^a$ is an edge view thereof.

Fig. 13$^b$ is an end view.

Fig. 14 is a face view of the member co-operating with said guide.

Fig. 14$^a$ is an edge view thereof.

Fig. 14$^b$ is a top plan of the same.

Fig. 15 is a side elevation of the dead rail column.

Fig. 15$^a$ is a rear elevation of the same.

Fig. 15$^b$ is a front view thereof.

Fig. 15$^c$ is a plan view of the same.

Fig. 16 is a side elevation of the bracket or brace for bracing the I-beam or casting above the dead rail stand.

Fig. 16$^a$ is an end elevation of the same.

Fig. 16$^b$ is a cross section of the same on the line x—w of Fig. 16.

Fig. 16$^c$ is an end view of the same.

Fig. 17 shows the indicator rigging manipulated to show the general center of gravity transversely.

Fig. 18 shows the engine tilted at a predetermined elevation in order to ascertain the center of gravity by means of a formula.

Fig. 19 is a cross section showing the indicator rigging in position.

Fig. 20 is a plan view of the pointer for the rigging.

Fig. 20$^a$ is an end view thereof.

Fig. 20$^b$ is a side elevation of the same.

Fig. 21 shows the indicator frame or rigging in normal position when the engine is tilted.

Referring to the drawings:—

25 represents the dead track rail. 26 is a scale unit as a whole. 26$^a$ is a scale pit. 27 represents the wheels of the scale unit or scale. 28 is the scale track. 29 are the wheels of the car or locomotive being weighed. 30, see Fig. 1, are steel wedges inserted between the flange 31 of the wheel 29 and the deck 44$^a$. 31 represents the flange of the wheel. 32 represents a pipe for applying hydraulic pressure for the hydraulic jack 33. 34 are pistons for the hydraulic jack 33. 35 is a weigh beam or weight indicator. 36, as shown in Figs. 2, 3 and 5, shows a structural iron located between the scale units for supporting dead track rails 41. 37 represent stands. 38 are short scale rails on deck 44$^a$. 40 are holes where the bolts are inserted for bolting the scale rail 38 and the rails 41 together. 41 represent rails between the rails 38, being supported by the rail stand 37. 42 is a liner inserted under the beam 36 and on the scale track 28 at 43, thereby freeing the scale rail 41 from the deck 44$^a$, leaving it ready to weigh. 44$^a$ are the scale decks. 46 are liners inserted between the tilting I-beam 50 and the foundation 47. 48 is the bracket or casting for holding the tilting I-beam 50 in vertical position. 49 are liners under the tilting I-beam. 50 is the tilting I-beam. 51 is the tilting rail. 52 is a guide for the tilting I-beam 50. 53 are the parallel sides of the indicator rigging frame. 54 is a frame for holding the indicator rigging in position. 55 is a slot for holding the lower part of the frame 53$^a$ in position. 56 is a rod pivotally connected to the bracket 57 for aiding in holding the frame 53 in position. 58, see Fig. 19, is a bracket having a slot as an aid in maintaining the indicator rigging frame in a vertical position. 59 is a measuring bar held in position by the frame 53, which position is parallel to the sides of the frame 53. 60 represent slots in the measuring bar 59 and part of the frame 53$^a$ for re-locating the said bar in case the engine slips on the rail. 61 is a vertical measuring bar, as shown in Figs. 16, 17 and 19, and is held in that position by the frame 54. This measuring bar is provided with wheels 62 which have runways on tracks 62½. 63 are brackets on the measuring bars 59 and 61 from which tight wires 61$^a$ are strung. 64 are movable indicators or pointers. 65 is a horizontal measuring bar graduated from zero right and left. 66 and 67 are coöperating parts of a guide for the scale track 28. 68 are the dead rail stands holding in position a dead track rail 25. 69 are contact points. 70 represent grooves in which the contacts 69 are placed. 71 is a horizontal rod for the purpose of preventing the engine if it happens to slip transversely from shoving the deck 44$^a$ against the rail 25. 72 are the nuts or heads of the rods 71. 73 is a turn buckle in the rod 56 for re-locating the frame 53 in case it slips on the rail 25.

74 represent the main levers of the scale units. 75 are the knife edges. 76 the main lever stand, 77 the upper lever and 78 the under lever. 79 is the connector between the upper and under levers. 80 is the scale frame. 81 is the journal box. 82 is the weigh beam poise. 83 the trig loop. 84 are the axles for the scale units. 85 are the bearing plates. 86 is the weigh beam stand. 87 is the balance ball on the weigh beam. 88 is the stand for the upper lever. 89 is the stand for the under lever. 90 are clamps for holding the scale rail 38 in position. The total reduction or multiplication of the levers is 100. It is not necessary to maintain this multiplication or reduction as it can be either less or more.

The operation of the scale is as follows: To weigh a locomotive in order to ascertain the axle loads, place the engine on the rails 25, Fig. 1. This can be done very readily as the rails 25 are connected up with the approaching track in the usual way. Place each scale or unit 26 directly under the axle of each pair of wheels as shown in Fig. 5. There are as many units or scales as there are pairs of wheels. The units 26 can be shifted to suit the wheel base of the locomotive as they are provided with wheels 27 and run back and forth on the scale track 28. When the units 26 are in position under the wheels 29, insert the steel wedges 30 under the flanges 31 of the wheels 29. Having completed this operation, turn the hydraulic pressure into the pipes 32 and jacks 33. This will cause the piston 34 of the jacks 33, Fig. 1, to raise the scale track 28 and scale unit 26, which, in turn, raises the engine by the flanges 31 from the rails 25, to a new and coincident horizontal plane. The tread of wheels 27 need not be more than ½ inch higher than the top of the rail 25. The scale track 25 is maintained in a vertical position by the guides 66 and 67, Figs. 13 and 14, which, in turn, are held in position by the dead rail stand 68, Fig. 15.

While the engine is in this position, go down into the scale pit 26ᵃ and weigh each pair of wheels 29. This can be done readily as there is a complete scale or unit 26, Figs. 7, 8 and 9, for every pair of wheels. The weight indications are taken from the beams 35. You now have the weight of each pair of wheels as well as the total weight of the engine, the latter being obtained by adding the total weight on all the axles. This operation having been completed, release the hydraulic pressure, and the scale track 28 and the scale units 26 will fall to their former normal position, thereby letting wheels down again on to the rails 25. Remove the wedges 30, and move the engine away.

To ascertain the weight on each end of the axles as well as the weight of each side of the locomotive, space the units 26 to suit the wheel base of the engine, as shown in Figs. 5 and 6, and place supporting beams 36, stands 37 and rails 41 in position. See Figs. 5 and 6. Bolt rails 38, 41 and 51 together at 40. Place transverse check rods 71, Figs. 2 and 3, in position. The object of this rod is to prevent the distance between the contact points 69 on the rails 38 and 51 from increasing if by chance there should be a transverse slip of the engine toward the lower rail 38. Should there be any slipping, the friction on the nuts or head of the rod 71 is reduced to a minimum by suitable friction points under the head or nut 72. The rails 38, 41 and 51 are now ready for service. The locomotive, after having been let down on rails 25 is moved away from the scale pit to a point where a switch is thrown, then returned and placed on rails 41 and 51 with each pair of wheels directly over the units 28 as formerly spaced. Loosen the bolts in rails 38 and 41 at 40 and insert a liner 42 under the beam 36 and the scale track 28 at 43. The insertion of the liner 43 lifts the rail 41 from the deck 44ᵃ, thereby freeing it and leaving it in balance ready to weigh.

Go to each scale unit 26 and weigh each pair of wheels 29 by manipulating the beams 35, Fig. 2. As there is only one end of each pair of wheels on the scales 26, therefore only one end of the axle is weighed. By deducting the weight thus obtained from the weight of each pair of wheels as formerly obtained, the weight on each end of the axle is obtained. Deducting the total weights of the axle ends from the total weight of the locomotive will give the weight on each side of the engine.

This information provides means for locating the center line or neutral axis line of engine or other object being weighed. For instance, an engine weighing 300,000# if symmetrically built, the weight on each side of the engine is 150,000#. The neutral axis line is a line passing through the center of gravity of a locomotive or the device being weighed and perpendicular to the plane upon which said locomotive or other device rests. The neutral axis line and the center line are one and the same and they will intersect the center of the boiler and the center line between the cylinders. Now having secured the weight of each pair of wheels as well as the weight on each end of the axles of the wheels, the next operation is to find transversely the general center of gravity of the engine. Turn the pressure into the jacks 44, as shown in Figs. 1, 2, 3 and 18, and elevate the engine to a predetermined height, as shown by Fig. 3 and especially by Fig. 18. As a matter of safety in engine tilting, the maximum lift of the jacks 44 is restricted to small strokes, for instance not over 1 inch, and if desirable can be regulated to ¼ inch or ⅛ inch by using the liners 46. These strokes are followed closely with iron liners 46 inserted between the I-beam 50 and the foundation 47 near each bracket 48. To explain more clearly as to manipulating the liners 46, there are two different sets of liners: those already mentioned 46 and liners 49 located directly over the jacks 44. When pressure is turned into jack 44, as shown in Figs. 2 and 3, the engine by the intervening I-beam 50 and rail 51 is lifted or elevated to a predetermined height. The I-beam is maintained in a vertical position by the guides 52 which, in turn, are held in position by the bracket 48. See Figs. 1, 2, 3, 6, 12 and Figs. 10 and 11 for details of guides 52. When the stroke of the jack 44 has been made, the I-beam 50 is blocked near the bracket 48 with the liners 46. After this has been done, release the pressure in the jack and insert another liner 49 over the jack 44 and turn on the pressure, repeating the operation until the engine is elevated to the desired height.

When the predetermined height has been reached, weigh the engine to ascertain how much weight is on the lower rail 38, and add the total weights as indicated on the beam 35. Subtract the result from the total weight of the engine, and the remainder will be the weight on high rail 51.

Now having on hand that the total weight of the engine is 300,000#, the weight on the lower rail is 280,000# and on the higher rail 20,000# when the engine is tilted, the method of procedure is as follows:

P = the total weight of the engine— 300,000#.
P′ = the weight on the lower rail— 280,000#.
P″ = the weight on the high rail— 20,000#.

By measurements the following additional information is obtained. See Fig. 18.

A = elevation of rail—15″.
B = distance between points of rail contacts—58¼″.
C = distance between points of rail contacts and center-line of engine—29½″.
Let E = angle formed by line of gravity and center line of engine elevated
Let F = distance between intersecting points on line of rail contact with line of gravity and center line of engine elevated.
Let H = height of center of gravity from rail.
Let X = distance between line of gravity and contact point on lower rail, with engine elevated.

The following formula, which is generally accepted by mathematicians, is used in connection with the above information in order to obtain the result desired. See Fig. 18.

$$P = P' + P''$$
$$P'' = P - P'$$
$$P : P'' :: B : X$$
$$X = \frac{P'' \times B}{P}$$
$$F = C - X \sec E$$
$$\tan E = \frac{A}{B}$$
$$\sec E = \sec 14° 26' 30''$$
$$F = C - X \sec E$$
$$F = H \tan E$$
$$H = \frac{F}{\tan E}$$

Required—to find the value of X and H.
Given  A = 15″
B = 58¼″
C = 29½″
P = 300,000#
P' = 280,000#
P'' = 20,000#

Following is the solution, values being substituted in the above formula:

$$300,000 = 280,000 + 20,000$$
$$P'' = 20,000$$
$$300,000 : 20,000 = 58.25'' : X''$$
$$X = \frac{20,000 \times 58.25''}{300,000} = 3.883''$$
$$F = 29.5'' - 3.883 \sec E$$
$$\tan E = \frac{15''}{58.25} = .2575'' \text{ or } 14° 26' 20''$$
$$\sec E = 1.0326''$$
$$F = 29.5'' - 1.0326 \times 3.883'' = 25.4904''$$
$$H = \frac{25.4904''}{.2575} = 98.99''$$

To find the center of gravity of each pair of wheels, use the same method.

To find the general center of gravity of a locomotive longitudinally, find the center of gravity of each pair of wheels and then use one of the standard formulas for ascertaining the common center of gravity of two or more bodies.

The construction and operation of the indicator rigging for indicating the center of gravity is as follows:

The frame 53, Figs. 16, 17 and 19, is rigid and is held in a vertical position by the frame 54, slot 58 and the arm 56, the latter having a pivot connection with the frame 53 and the lug or bracket 57. The frame is located on the scale rail 38 and the tilting rail 51 so that when the engine is tilted the frame 53 is also tilted. The latter is held vertically in position by the frame 54, but is allowed to rise and fall on account of a suitable slot 58 on the frame 54 and slot 55.

A measuring bar 59 is held in position by the frame 53, preferably by bolts through slotted holes at 60 so that if the engine slips on the rails while being elevated, the measuring bar 59 can be reset at the center line of the engine. The arm 56 is provided with a turn buckle also to take care of any slipping of the engine by moving the entire frame instead of moving the measuring bar 59.

A vertical measuring bar 61, Figs. 16, 17, and 19, is held in position by frame 54. This bar 61 is provided with a suitable roller 62 and a track 62½. The bars 59 and 61 are both provided with brackets 63 from which are strung taut wires 61ª. The said bars are also provided with movable indicators 64, Figs. 16, 17, 19 and 20.

A horizontal measuring bar 65, Figs. 16, 17 and 19, is provided and is held in position by the frame 54 or other means, and the face of the same is graduated to show the lineal dimensions, reading from zero both right and left to about 30 inches. The zero mark on the bar 65 is placed at a point corresponding to the center line or neutral axis line of the engine, which usually is at a point exactly midway between the two contact points 69 on rails 38 and 51. It will be observed that the rails 38 and 51 have a groove 70 into which a round or other shaped piece of metal can be inserted in order to give and maintain definite contact points 72, the distance between which can be easily measured. Figs. 2, 3, 8 and 9.

To ascertain the center of gravity with the indicator rigging, Figs. 16, 17 and 19, weigh engine on rails 25, Fig. 1, that is, place engine on rails 25, and lift from same by flanges 31 and weigh as formerly explained to obtain weight on each pair of wheels. Let engine down and place on rails 38 and 51, Fig. 2, then weigh again with engine level. This operation gives the weight on each end of axle, or each side of engine. Now if the total weight of engine is 300,000# and the weight on each side is 150,000#, then the center line of the engine and neutral axis line are the same. Set the zero mark of the horizontal bar 65 on the line of the center line of the engine. If engine is placed on the rails centrally, the center line and neutral axis line will be at a point exactly midway between the contact points 69 of the rails 38 and 51. Set the wire 70 of the bar 59 at zero and secure said bar to frame 53 so it will not move when it tilts. Elevate engine as previously explained to a predetermined height, say 8½ inches, and weigh engine. If the weight on the lower rail is 225,000 pounds, then that weight is 50 per cent. more than it formerly was on that rail. The distance from the center or neutral axis line of the engine when level to the contact point of the lower rail is 29.125 inches. Now 50% of this distance is 14.5625 inches. Move the vertical bar 61 and place the wire of the same 14.5624 inches from zero on the horizontal bar, and the point where the two wires of bar 61 and bar 59 intersect or cross is the general center of gravity of the engine transversely.

The guides 66 and 67 for the scale track 28 are deemed of special importance in this connection and a distinctive feature, for in devices of this character it is most essential that the scale track be caused to rise and fall vertically. Heretofore where links have been employed for this purpose, if the greatest precision is not used in locating the links they will work against each other and will prevent the scale track from lowering itself and causing it to buckle. The guides 66 and 67 eliminate these defects entirely.

From the foregoing, it will be seen that I have devised an efficient and reliable mechanism for the purposes above outlined, and while the structural embodiment of the invention as hereinbefore disclosed is what I at the present time consider preferable, it is evident that the same is subject to changes, variations and modifications in details, proportion and relative arrangement of parts, etc., without departing from the spirit of the invention or sacrificing any of its advantages. I, therefore, do not intend to restrict myself to the precise construction, arrangement of parts, etc., as hereinbefore disclosed, but reserve the right to make such changes, variations and modifications as come properly within the scope of the appended claims.

What is claimed as new is:—

1. In combination, a single scale adapted to support the whole of a vehicle, and a vertically movable support by the side thereof for supporting a vehicle so that the latter may rest partly on each at the same time for ascertaining the weight on each axle of the vehicle and also the weight on each end thereof.

2. In combination, a vehicle support and a scale arranged side by side so that the vehicle may rest partly on each at the same time, and means for moving the support in a vertical plane whereby the vehicle may be tilted and weighed in its tilted position.

3. In combination, a vehicle support on which a part of a vehicle may rest, a scale on which another part of the vehicle may rest, and means for raising said support to tilt and weigh a vehicle and determine the center of gravity thereof.

4. In combination, a vehicle support on which a part of a vehicle may rest, weighing means on which another part of the vehicle may rest, means for raising and lowering the support to tilt a vehicle and support the same in tilted position, and indicator mechanism constructed for coöperation with said support to determine the center of gravity of the vehicle.

5. In combination, a vehicle support on which a part of a vehicle may rest, weighing means on which another part of the vehicle may rest, means for raising and lowering the support to tilt a vehicle and support the same in tilted position, indicator mechanism constructed for coöperation with said support to determine the center of gravity of the vehicle, and means independent of said support for weighing the vehicle in its tilted position.

6. In combination, a vertically movable support for tilting a vehicle, weighing means for ascertaining the entire weight on an axle as well as the weight on one end, said support and weighing means adapted each to support one end of the axle at the same time, and means to determine the center of gravity of such vehicle when in its tilted position.

7. In combination, a support for the vehicle independent of the scale, means for raising said support to tilt the vehicle and hold it in its tilted position, said support and scale adapted each to support different ends of the axle at the same time, and guiding means for the support and coöperating means, the whole constructed to locate the center of gravity of the vehicle.

8. In combination, a dead rail stand, a scale track adapted to support the scale to engage a vehicle and lift it from the dead rail, means to maintain the scale track in vertical position, a single scale supported on the scale track for ascertaining the weight on each axle and also on each end thereof and hydraulic means to cause said track to rise or fall a predetermined distance, said scale adapted to support one end only of a car axle, and means independent of the scale for supporting the other end.

9. In combination, a frame, means for tilting the frame and a vehicle, said means being adapted to maintain the sides of the frame parallel to the neutral axis of the vehicle being weighed, a scale, said tilting means and scale being adapted each to support one end of the axle at the same time, and an indicator rigging mounted over the scale for locating the center of gravity of the vehicle being weighed.

10. In combination, a frame, means for tilting the frame and a vehicle, said means being adapted to maintain the sides of the frame parallel to the neutral axis of the vehicle being weighed, a scale, said tilting means and scale being adapted each to support one end of the axle at the same time, and an indicator rigging mounted on said frame and over the scale for locating the center of gravity of the vehicle being weighed.

11. In combination, a frame, means for tilting the frame and a vehicle, said means being adapted to maintain the sides of the frame parallel to the neutral axis of the vehicle being weighed, a scale, said tilting means and scale being adapted to support one end of the axle at the same time, and an indicator rigging mounted on said frame above the scale and comprising a movably mounted member adjustable transversely of the frame.

12. In combination, a frame, means for tilting the frame and a vehicle, said means being adapted to maintain the sides of the frame parallel to the neutral axis of the vehicle being weighed, a scale, said tilting means and scale being adapted each to support one end of the axle at the same time, an indicator rigging mounted on said frame above the scale and comprising a movably mounted member adjustable transversely of the frame and a coöperating measuring bar.

13. In combination, a frame, means for tilting the frame and a vehicle, said means being adapted to maintain the sides of the frame parallel to the neutral axis of the vehicle being weighed, a scale, said tilting means and scale being adapted each to support one end of the axle at the same time, an indicator rigging mounted on said frame above the scale and comprising a movably mounted member adjustable transversely of the frame, a coöperating measuring bar, and wires carried by said bar and arranged to cross each other.

14. In combination, a weighing scale, means to one side of the last-named scale for supporting one end of a vehicle in an inclined position upon the weighing scale, an indicator rigging comprising a horizontally movable graduated bar, a tiltable frame, a graduated bar carried thereby for coöperation with the first-named bar.

15. In combination, a weighing scale, means to one side of the last-named scale for supporting one end of the axle of a vehicle in an inclined position upon the weighing scale, an indicator rigging comprising a horizontally movable graduated bar, a tiltable frame, a graduated bar carried thereby for coöperation with the first-named bar, and wires carried by said bars and arranged to cross to determine the center of gravity of the article being weighed.

16. In combination, a weighing scale, means to one side of the last-named scale for supporting one end of the axle of a vehicle in an inclined position upon the scale, an indicator rigging comprising a horizontally movable graduated bar, a tiltable frame, a graduated bar carried thereby for coöperation with the first-named bar.

17. In combination, a weighing scale, means to one side of the last-named scale for supporting one end of the axle of a vehicle in an inclined position upon the scale, an indicator rigging comprising a horizontally movable graduated bar, a tiltable frame, a graduated bar carried thereby for coöperation with the first-named bar, and wires carried by said bars and arranged to cross each other to determine the center of gravity.

18. In combination, a weighing scale, means by the side of and independent of the last-named scale for supporting one end of the axle of a vehicle in an inclined position upon the weighing scale, a vertically movable I-beam, means for elevating the same, a guide for said I-beam, a parallel-sided indicator rigging frame, a frame for holding the indicator rigging, said first-named frame being tiltably mounted, and indicator bars carried by said frames and arranged for coöperation to locate the center of gravity of the vehicle being weighed.

19. In combination, a weighing scale, means by the side of and independent of the last-named scale for supporting one end of the axle of a vehicle in an inclined position upon the weighing scale, a vertically movable I-beam, means for elevating the same, a guide for said I-beam, a parallel-sided indicator rigging frame, a frame for holding the indicator rigging, said first-named frame being tiltably mounted, indicator bars carried by said frames and arranged for coöperation to locate the center of gravity of the vehicle being weighed, and wires carried by said bars and arranged to cross as the one frame is tilted.

20. In combination, a weighing scale, means for supporting one end of the axle of a vehicle in an inclined position upon the weighing scale, a locomotive support independent of the scale, means for raising said support, and means operable by the raising of said support for determining the center of gravity of the vehicle being weighted.

21. In combination, a weighing scale, means including a rail for supporting one end of the axle of a vehicle in an inclined position upon the weighing scale, a movable rail, means adjacent the weighing scale for elevating said rail, the vehicle being adapted to rest upon both rails simultaneously.

22. In combination, means for supporting one end of the axle of a vehicle in an inclined position upon the weighing scale, a weighing scale, a movable rail, means adjacent the weighing scale for elevating said rail and an indicator mechanism disposed above the weighing scale and actuated by the raising of said rail.

23. In combination, a weighing scale, a vertically movable support located adjacent thereto, hydraulic means for raising said support, the vehicle adapted to rest partly on said scale and support at the same time, and means for determining the center of gravity of the vehicle being weighed.

24. In combination, a weighing scale, a vertically movable rail disposed adjacent thereto and to one side thereof, means for elevating said rail and means for determining the center of gravity of the vehicle being weighed, said means embodying a pivotally mounted frame and an indicator bar movable with said frame for coöperation therewith.

25. In combination, a weighing scale, a movable rail disposed adjacent thereto, means for elevating said rail, means for determining the center of gravity of the vehicle being weighed, embodying a pivotally mounted frame and an indicating bar movable therewith and a coöperating indicating bar adjustable with relation to the first-named bar, said means being disposed above the weighing scale.

26. In combination, a weighing scale, a movable rail disposed adjacent thereto, means for elevating said rail, means for determining the center of gravity of the vehicle being weighed, embodying a pivotally mounted frame and an indicating bar movable therewith and a coöperating indicating bar adjustable with relation to the first-named bar, said means being disposed above the weighing scale, and wires carried by said bars and arranged to be crossed to indicate the center of gravity.

27. In combination, means for supporting one end of the axle of a vehicle in an inclined position upon the weighing scale, a dead rail stand, a scale track supporting said weighing scale, means to maintain the scale track in a vertical position, a vertically movable I-beam, and means to cause the scale track to rise or fall a predetermined distance, and a weighing scale, said scale and supporting means adapted each to support one end of the axle at the same time.

28. In combination, means for supporting one end of the axle of a vehicle in an inclined position upon the weighing scale, including a vertically movable I-beam and rail, means to maintain said I-beam in a vertical position, a weighing scale, said scale and supporting means adapted each to support one end of the axle at the same time, and means to cause the said I-beam to rise or fall a predetermined distance.

29. In combination, a weighing scale and a support independent thereof, whereby the vehicle may rest partly on each at the same time, a frame, means for maintaining the vertical sides of said frame parallel to the neutral axis of the vehicle being weighed, an adjustable measuring bar attached to said frame, a vertical measuring bar mounted to travel transversely from one side of the frame to the other, and means for raising said support to tilt said frame and the vehicle.

30. In combination, a weighing scale, and a support for one end of the vehicle in an inclined position upon the weighing scale so that the vehicle may rest partly on each at the same time, a frame, means for maintaining the sides of the frame parallel to the neutral axis of the vehicle being weighed, means to re-locate or adjust said frame, a wire, an adjustable measuring bar mounted on said frame for supporting said wire, a vertical measuring bar, an independent frame from which it is suspended, said bar mounted to travel transversely and having an indicator, a wire on said last-named bar for suspending said last-named wire, and means for tilting one of said frames and the vehicle.

In testimony whereof I affix my signature in presence of two witnesses.

BYRON B. GORDON.

Witnesses:
H. C. JOHNSON,
E. H. MAY.